United States Patent
Ciprian et al.

(10) Patent No.: US 6,878,802 B2
(45) Date of Patent: Apr. 12, 2005

(54) METHOD OF PRODUCING AN ALCOHOLIC SOLUTIONS OF POLYETRAHYDROFURANE THAT COMPRISES TERMINAL OH GROUPS

(75) Inventors: Jürgen Ciprian, Ludwigshafen (DE); Wulfrich Friedemann Beer, Neustadt (DE); Volkmar Menger, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/486,823
(22) PCT Filed: Aug. 20, 2002
(86) PCT No.: PCT/EP02/09297

§ 371 (c)(1),
(2), (4) Date: Feb. 19, 2004

(87) PCT Pub. No.: WO03/018666

PCT Pub. Date: Mar. 6, 2003

(65) Prior Publication Data

US 2004/0186270 A1 Sep. 23, 2004

(30) Foreign Application Priority Data

Aug. 21, 2001 (DE) .......................................... 101 40 949

(51) Int. Cl.$^7$ ............................................... C08G 64/02
(52) U.S. Cl. ...................... 528/480; 528/403; 528/616
(58) Field of Search ................................ 528/403, 480; 568/616

(56) References Cited

U.S. PATENT DOCUMENTS

2004/0024172 A1 * 2/2004 Sigwart et al. .............. 528/403

FOREIGN PATENT DOCUMENTS

| DE | 197 58 296 | 7/1999 |
| EP | 0 376 157 | 7/1990 |
| EP | 0 927 732 | 7/1999 |

* cited by examiner

*Primary Examiner*—Terressa Boykin
(74) *Attorney, Agent, or Firm*—Oblon, Spivak, McClelland, Maier & Neustadt, P.C.

(57) ABSTRACT

In a process for preparing polytetrahydrofuran having terminal OH groups (PTHF) from the corresponding polytetramethylene ether having acyloxy end groups by transesterification with alcohols in the presence of a sodium-containing catalyst followed by passing the alcoholic PTHF solution in the presence of a catalytic amount of water directly through at least one ion exchanger to remove the sodium ions, the removal of the sodium ions is carried out in a fully continuous ion exchange unit which comprises:

Figure 1:
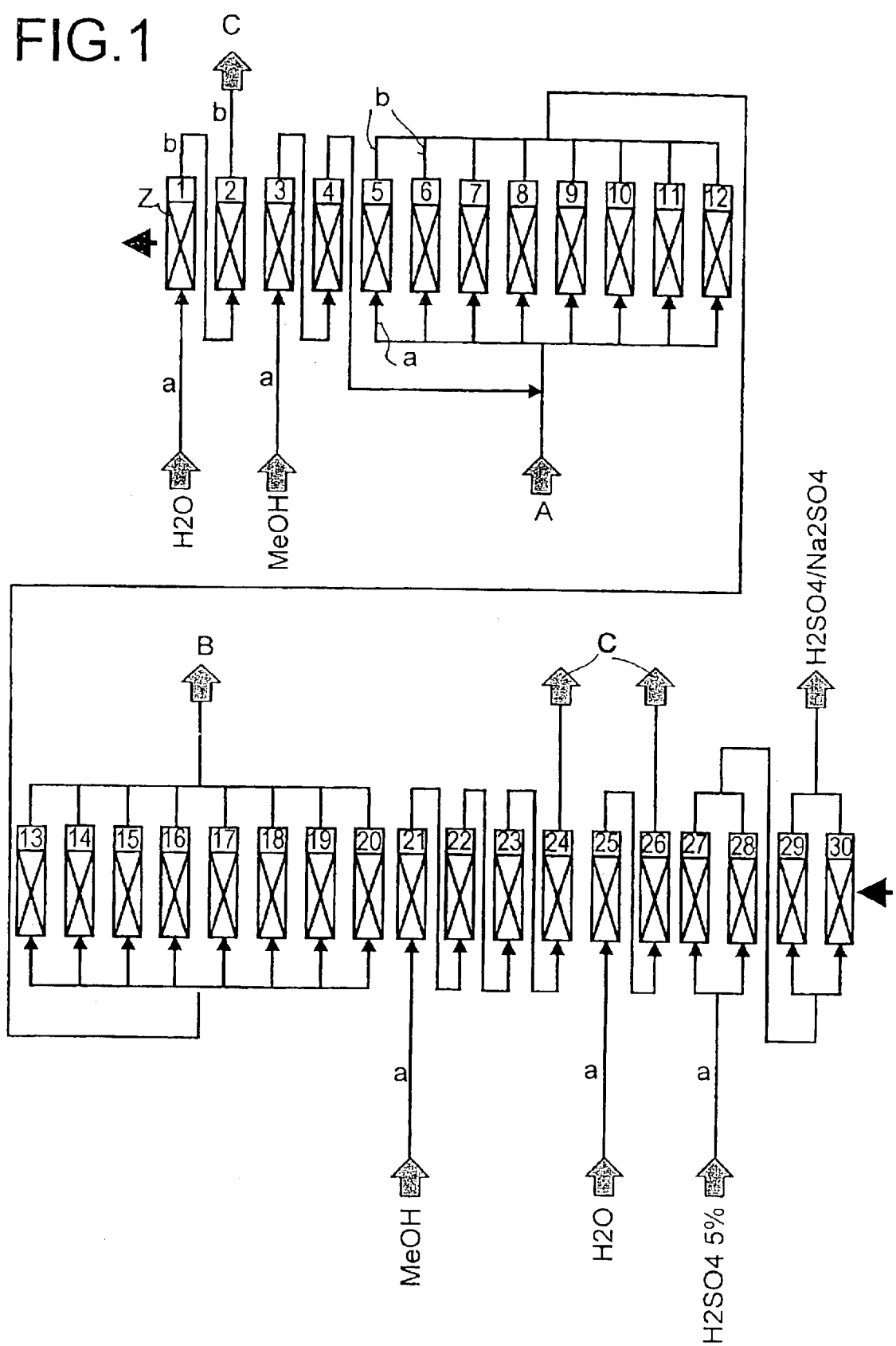

a plurality of ion exchange cells (Z) which are arranged on a rotary platform and are each provided with a distribution element and a collection element and a central valve (V) having a stator disk (S) and a rotor disk (R) via which the introduction and discharge of all liquid streams into or out of the ion exchange unit occurs, and feed and discharge lines from each ion exchange cell (Z) to the central valve (V).

7 Claims, 2 Drawing Sheets

METHOD OF PRODUCING AN ALCOHOLIC SOLUTIONS OF POLYETRAHYDROFURANE THAT COMPRISES TERMINAL OH GROUPS

The present invention relates to a process for preparing an alcoholic solution of polytetrahydrofuran having terminal OH groups from the corresponding polytetramethylene ether having acyloxy end groups by transesterification with alcohols in the presence of an alkali or alkali earth metal containing catalyst followed by removal of the alkali or alkali earth metal ions by passing the reaction mixture over an ion exhanger.

DE-A 197 58 296, which is hereby fully incorporated by reference into the present patent application, discloses the preparation of polytetrahydrofuran having terminal hydroxyl groups, hereinafter referred to as PTHF for short, from tetrahydrofuran using cationic catalyst systems. In a first step, this gives a polytetramethylene ether having acyloxy end groups which are dependent on the initiator system and reaction medium. These acyloxy end groups in the polymer obtained initially are then converted into alcohol functions by transesterification with lower alcohols, in particular $C_1$–$C_4$-alcohols, preferably methanol, in the presence of alkaline catalysts, preferably sodium methoxide. After the transesterification, the ionic sodium originating from the catalyst has to be removed from the alcoholic, in particular methanolic, PTHF solution again, since it would interfere in the subsequent use of the PTHF, predominantly for polyurethane applications. The removal of the sodium ions is in this case carried out by passing the alcoholic, in particular methanolic, PTHF solution directly over at least one bed of ion exchangers.

It is an object of the present invention to provide a process for removing the alkali or alkali earth metal ions by means of an ion exhanger which can be carried out more simply and more economically, in particular fully continuously.

The achievement of this object starts out from a process for preparing an alcoholic solution of polytetrahydrofuran having terminal OH groups (PTHF) from the corresponding polytetramethylene ether having acyloxy end groups by transesterification with alcohols in the presence of a alkali or alkali earth metal containing catalyst followed by passing the alcoholic PTHF solution in the presence of a catalytic amount of water directly through at least one ion exchanger to remove the alkali or alkali earth metal ions.

In the process of the present invention, the removal of the alkali or alkali earth metal ions is carried out in a fully continuous ion exchange unit which comprises:
 a plurality of ion exchange cells which are arranged on a rotary platform and are each provided with a distribution element and a collection element and
 a central valve having a stator disk and a rotor disk via which the introduction and discharge of all liquid streams into or out of the ion exchange unit occurs, and
 feed and discharge lines from the distribution or collection element of each ion exchange cell to the central valve.

The process is thus, according to the present invention, carried out in a fully continuous unit, i.e. in a unit which can in principle be in operation continually. If it is necessary to replace the ion exchange resin in individual ion exchange cells, this can be carried out, in particular hydraulically, during operation. As seen by an observer outside the unit, all process steps, i.e. ion exchange, washing and regeneration, always occur at the same fixed physical position in the unit.

The transesterification is preferably carried out in the presence of a sodium-emtaining catalyst.

The product stream which comes form the transesterification and is passed to removal of alkali or alkali earth metal ions by means of an ion exchanger generally has a PTHF content in the range from 50 to 60% by weight, a balance of methanol and alkali or alkali earth metal ions in a concentration of less than 1,000 ppm, preferably from 100 to 600 ppm. The ion exchange process reduces the alkali or alkali earth metal content of the PTHF solution to values below 1 ppm, preferably below 0.5 ppm, particularly preferably below 0.3 ppm.

The ion exchange process is carried out by a method analogous to that described in DE-A 197 58 296, in the presence of catalytic amounts of water over a strong acid cation exchanger which may be, in particular, in gel form or in the form of a macroporous, highly crosslinked resin. This involves the process steps described there, viz.:
 1. ion exchange with the PTHF solution being fed to the ion exchanger,
 2. displacement of the PTHF solution by introduction of methanol,
 3. first washing with distilled water,
 4. regeneration, in particular using sulfuric acid,
 5. second washing with distilled water and
 6. Displacement of the distilled water by introduction of methanol.

The unit used according to the present invention comprises a rotary plate, i.e. a rotatable support for accommodating a plurality of ion exchange cells, i.e. generally tall cylindrical chambers which are filled with strong acid cation exchangers as are described in DE-A 197 58 296 for fixed beds. The ion exchange cells each have a distribution element and a collection element for the uniform distribution or collection of the liquid flowing through the ion exchange cell over its entire cross section.

A single central valve having a stator disk and a rotor disk is provided for the introduction or discharge of all liquid streams into or out of the ion exchange unit. The central valve is usually located in the center of the circular array of ion exchange cells, in general above this array. From the central valve, preferably unpluggable feed and discharge lines lead to the distribution or collection element of each ion exchange cell.

A particularly useful number of ion exchange cells for the sequence of process steps in the removal of the alkali or alkali earth metal ions is in the range from 20 to 30.

The feed and discharge lines from the distribution or collection element of each ion exchange cell to the central valve are preferably configured as flexible hose connections.

In a preferred embodiment, the central valve and the rotary platform carrying the ion exchange cells are each controlled separately, with particular preference being given to the rotary platform being operated fully continuously and the central valve being operated in a pulsed fashion. This particularly preferred embodiment makes it possible to avoid cross contamination, i.e. incorrect flows to or from the ion exchange cells.

The ion exchange process is preferably carried out in a plurality of ion exchange cells connected in parallel or in series.

More preferably, one or more of the regeneration, washing and displacement steps can be carried out in parallel and/or in series in a plurality of ion exchange cells.

As a result, an appropriate number of ion exchange cells is in each case made available for individual process steps of the overall process which occur at different rates, so that the different rates of individual process steps do not interfere with the fully continuous operation of the overall process.

The present invention thus provides a fully continuous process for removing the alkali or alkali earth metal ions by means of an ion exchanger in a process for preparing PTHF.

The unit used according to the present invention is, in particular, controlled by means of a single central valve instead of at least 24 individual valves as in the known process using two fixed beds. In the known process, the individual valves were essentially shut off from one another and also had to be free of leaks in operation, and were thus susceptible to malfunctions. Furthermore, the unit used according to the present invention which has a single central valve displays increased flexibility in terms of process variants by simply unplugging the hoses for the introduction and discharge of liquids at the central valve and reconnecting them differently. The flexible connection opportunities lead to the further advantage of multiple utilization of washing, regeneration and displacement media and thus to a further reduction in the operating costs.

The invention is illustrated below with the aid of a figure and examples.

Figure 2:
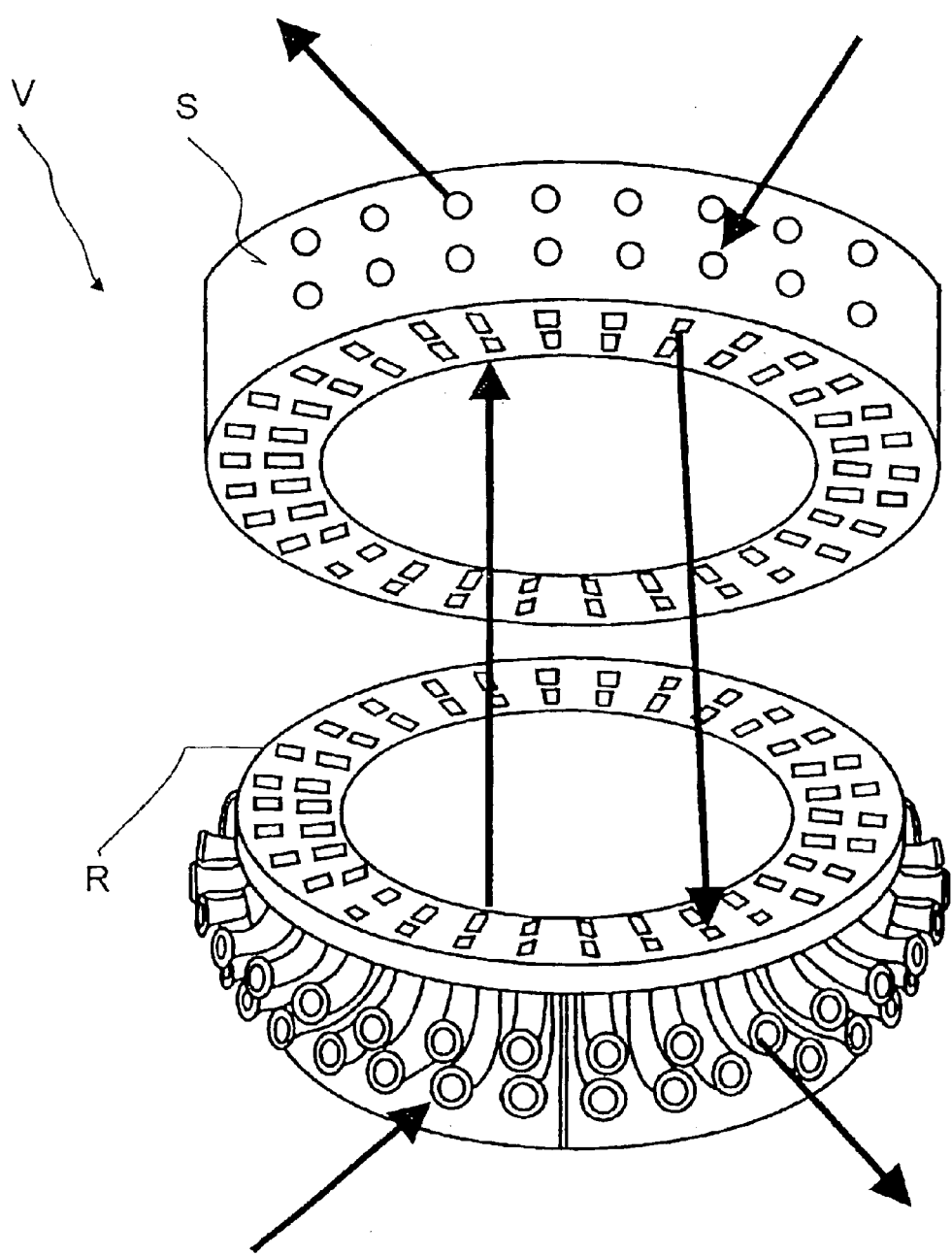

In the figures:

FIG. 1 schematically shows a fully continuous ion exchange unit for the process of the present invention and FIG. 2 schematically shows a central valve for a unit as shown in FIG. 1.

FIG. 1 shows a fully continuous ion exchange unit comprising, by way of example, 30 ion exchange cells Z numbered consecutively from 1 to 30 and provided with feed lines a and discharge lines b. The alcoholic PTHF solution to be purified is fed in parallel as stream A to the ion exchange cells Z 5 to 12, purified and, in a second stage, likewise fed in parallel to the ion exchange cells Z 13 to 20. Ion exchange takes place in the ion exchange cells Z 5 to 20. The product, viz. the purified alcoholic PTHF solution, is taken off as stream B from the ion exchange cells Z 13 to 20. The subsequent process step, viz. the displacement of the alcoholic PTHF solution by introduction of methanol (MeOH), takes place in the subsequent ion exchange cells Z which are numbered 3 and 4 and are connected in series. Washing with distilled water takes place in the next process step, shown by way of example in the figure by introduction of water ($H_2O$) into the ion exchange cells, Z 1 and 2, which are connected in series. The washings C are taken off from the ion exchange cell Z 2. The ion exchange cells are subsequently regenerated by means of 5% strength sulfuric acid ($H_2SO_4$), here shown, by way of example, in the ion exchange cells Z 27 to 30, which are connected in parallel and in series. After a second washing with distilled water ($H_2O$) in the ion exchange cells Z 25 and 26 which are connected in series and from which a washing stream C is taken off, the distilled water is displaced by introduction of methanol (MeOH) into the ion exchange cells Z 21 to 24 which are connected in series, likewise with a washing stream C being taken off. During operation, the ion exchange unit rotates in the direction of the arrow in the figure.

FIG. 2 shows a central valve V comprising a stator disk S and a rotor disk R with feed and discharge lines.

EXAMPLE

Compared to the removal of sodium ions from a methanolic, sodium-containing PTHF solution by means of two fixed beds of ion exchanger connected in series, as is known from DE-A 197 58 296, the same separation task, i.e. the reduction of the sodium content of the same alcoholic PTHF solution to a concentration below 1 ppm, was carried out using the same strong acid cation exchanger in the form of a macroporous, highly crosslinked resin but in a fully continuous ion exchange unit as shown in FIG. 1.

Compared to the process described in DE-A 197 58 296, the following savings in auxiliaries were achieved: amount of ion exchanger about 50%, sulfuric acid about 10%, methanol about 10% and amount of distilled water required about 25%.

We claim:

1. A process for preparing an alcoholic solution of polytetrahydrofuran having terminal OH groups (PTHF) from the corresponding polytetraxmethylene ether having acyloxy end groups by transesterification with alcohols in the presence of an alkali or alkali earth metal containing catalyst followed by passing the alcoholic PTHF solution in the presence of a catalytic amount of water directly through at least one ion exchanger to remove the alkali or alkali earth metal ions, wherein the removal of the alkali or alkali earth metal ions is carried out in a fully continuous ion exchange unit which comprises:
a plurality of ion exchange cells which are arranged on a rotary platform and are each provided with a distribution element and a collection element and
a central valve having a stator disk and a rotor disk via which the introduction and discharge of all liquid streams into or out of the ion exchange unit occurs, and
feed and discharge lines from the distribution or collection element of each ion exchange cell to the central valve.

2. The process as claimed in claim 1, wherein the transesterification is carried out in the presence of a sodium-containing catalyst.

3. The process as claimed in claim 1, wherein the ion exhange unit has from 20 to 30 ion exchange cells.

4. The process as claimed in claim 1, wherein the feed and discharge lines from the distribution or collection element of each ion exchange cell to the central valve are flexible hoses.

5. The process as claimed in claim 1, wherein the central valve and the rotary platform are each controlled separately, in particular with the rotary platform being operated fully continuously and the central valve being operated in a pulsed fashion.

6. The process as claimed in claim 1, wherein the ion exchange process is carried out in parallel and/or in series in a plurality of ion exchange cells.

7. The process as claimed in claim 1, wherein one or more of the regeneration, washing and displacement steps are each carried out in parallel and/or in series in a plurality of ion exchange cells.

* * * * *